(12) United States Patent
Dudko et al.

(10) Patent No.: US 10,750,207 B2
(45) Date of Patent: Aug. 18, 2020

(54) METHOD AND SYSTEM FOR PROVIDING REAL-TIME VIDEO SOLUTIONS FOR CAR RACING SPORTS

(71) Applicant: Because Production, Kiev (UA)

(72) Inventors: Mykhailo Dudko, Los Angeles, CA (US); Anatolii Krapivin, Kiev (UA)

(73) Assignees: Mykhailo Dudko, Los Angeles, CA (US); Anatolii Krapivin, Kyiv (UA)

( * ) Notice: Subject to any disclaimer, the term of this patent is extended or adjusted under 35 U.S.C. 154(b) by 0 days.

(21) Appl. No.: 15/487,383

(22) Filed: Apr. 13, 2017

(65) Prior Publication Data

US 2017/0302970 A1   Oct. 19, 2017

Related U.S. Application Data

(60) Provisional application No. 62/322,185, filed on Apr. 13, 2016.

(51) Int. Cl.
| | | |
|---|---|---|
| *H04N 5/77* | (2006.01) | |
| *H04N 21/218* | (2011.01) | |
| *H04N 7/18* | (2006.01) | |
| *H04N 21/214* | (2011.01) | |
| *H04W 4/02* | (2018.01) | |
| *H04W 4/029* | (2018.01) | |
| *H04W 4/44* | (2018.01) | |
| *H04N 5/247* | (2006.01) | |
| *H04N 5/232* | (2006.01) | |
| *H04N 9/82* | (2006.01) | |
| *H04L 29/06* | (2006.01) | |

(Continued)

(52) U.S. Cl.
CPC ..... *H04N 21/21805* (2013.01); *H04L 65/602* (2013.01); *H04N 5/23206* (2013.01); *H04N 5/247* (2013.01); *H04N 5/77* (2013.01); *H04N 5/772* (2013.01); *H04N 7/181* (2013.01); *H04N 9/8205* (2013.01); *H04N 21/2143* (2013.01); *H04W 4/023* (2013.01); *H04W 4/029* (2018.02); *H04W 4/44* (2018.02); *H04L 2012/40215* (2013.01); *H04L 2012/40273* (2013.01); *H04W 84/12* (2013.01)

(58) Field of Classification Search
USPC ......................................... 386/223–224, 248
See application file for complete search history.

(56) References Cited

U.S. PATENT DOCUMENTS 9,194,955 B1 * 11/2015 Fahrner ................... G01S 19/16
9,218,789 B1 * 12/2015 Lininger .................. G09G 5/14
(Continued)

*Primary Examiner* — Nigar Chowdhury

(57) ABSTRACT

Techniques, systems, and devices are disclosed for capturing and delivering real-time racing videos when a race car travels around a racetrack. The disclosed systems and techniques are designed to capture racing video signals both from the vantage point of the race car itself and using a set of cameras installed around the racetrack. The captured racing videos and racing metadata can be uploaded or streamed live to a server as the race car travels around a racetrack by connecting the race car to a nearby or the closest Wi-Fi hotspot to the race car within a set of Wi-Fi hotspot placed around the racetrack. The uploaded multiple channels of racing video signals can be combined with racing metadata collected from the race car to generate "meta-video" packages which can be automatically delivered in multiple formats.

18 Claims, 7 Drawing Sheets

(51) Int. Cl.
*H04W 84/12* (2009.01)
*H04L 12/40* (2006.01)

(56) References Cited

U.S. PATENT DOCUMENTS

| | | | |
|---|---|---|---|
| 2006/0038818 A1* | 2/2006 | Steele | H04N 21/235 345/440 |
| 2012/0162436 A1* | 6/2012 | Cordell | G11B 27/034 348/158 |
| 2012/0329429 A1* | 12/2012 | Jabara | G07F 17/3218 455/411 |
| 2013/0185743 A1* | 7/2013 | Arima | H04N 21/2543 725/1 |
| 2013/0303248 A1* | 11/2013 | Williams | A63F 9/143 463/6 |
| 2014/0267399 A1* | 9/2014 | Zamer | H04L 67/20 345/633 |
| 2015/0052546 A1* | 2/2015 | Ortiz | A63B 71/06 725/28 |
| 2015/0312354 A1* | 10/2015 | Boyle | H04N 21/21805 709/219 |
| 2015/0318015 A1* | 11/2015 | Bose | H04N 7/188 386/248 |
| 2015/0326774 A1* | 11/2015 | Chinery, III | H04N 7/181 348/207.1 |

* cited by examiner

METHOD AND SYSTEM FOR PROVIDING REAL-TIME VIDEO SOLUTIONS FOR CAR RACING SPORTS

PRIORITY CLAIM AND RELATED PATENT APPLICATIONS

This patent document claims benefit of priority under 35 U.S.C. 119(e) to U.S. Provisional Patent Application No. 62/322,185 entitled "METHOD AND SYSTEM FOR PROVIDING REAL-TIME VIDEO SOLUTIONS FOR CAR RACING SPORTS," and filed on Apr. 13, 2016. The disclosures of the above application are incorporated by reference in their entirety as a part of this document.

TECHNICAL FIELD

The present disclosure generally relates to real-time video signal capturing and transmission, and more specifically to systems, devices, and processes for capturing and transmitting real-time car racing videos and other racing related metadata.

BACKGROUND

Auto racing or car racing, a popular spectator sport in the United States and around the world, is also becoming increasingly popular as a participant sport. Businesses have been created to capitalize on the increasing number of racing hobbyists. Currently, there are a total of more than 1,400 racetracks across the nation. A portion of these racetracks allow their customers to rent and drive sports cars around the tracks for racing experience. On average, these tracks charge between $200 and $700 per 5 laps for the racing experience, depending on the type of racing vehicle and pricing policies. Additionally, these businesses sell racing videos of the customers driving the sports cars. Statistically, 50%-85% of all racetrack customers purchase the videos from their racing experiences. In some cases, videos that were not sold are stored for 6 months and get partially sold later on to returning customers. On average, each racetrack receives about 10,000-50,000 customers per year.

Existing racing video capturing systems are primarily based on in-car cameras which are onboard with the race cars. For example, some racing video capturing systems include both a dashboard (or "dash") camera for filming the racetrack ahead of the race car and a rear-view or pilot camera for filming the driver action. However, these existing systems do not provide sufficient control options by the customers and the resulting videos offer less than comprehensive racing experiences. As a result, the existing racing video capturing systems can compromise customers' willingness to purchase their racing videos after using the racetracks.

SUMMARY

Techniques, systems, and devices are disclosed for capturing and streaming real-time racing videos when a race car travels around a racetrack. The disclosed systems and techniques are designed to capture racing video signals both from the vantage point of the race car itself and from the racetrack using a set of cameras installed around the racetrack. The captured racing videos and racing metadata can be uploaded or streamed live to a server as the race car travels around the racetrack by connecting the race car to a nearby or the closest Wi-Fi hotspot to the race car within a set of Wi-Fi hotspot placed around the racetrack. The uploaded multiple channels of racing video signals can be combined with racing metadata collected from the race car to generate "meta-video" packages which can be automatically delivered in multiple formats. Additionally, the disclosed systems and techniques can upload the racing videos online to a number of social media outlets, find and detect the clients associated with the racing videos, and automatically share the hyperlinks and racing metadata with the clients. The disclosed systems and techniques can be configured to be fully automated and hence require zero film crew.

In one aspect, a real-time racing video capturing system is disclosed. This real-time racing video capturing system includes: one or more onboard cameras installed on a race car; a set of Wi-Fi hotspots positioned around the racetrack; and a controller installed on the race car and coupled to the one or more onboard cameras. This controller is configured to perform the following operations: controlling the one or more onboard cameras to start and stop recording racing videos; receiving in real-time racing videos captured by the one or more onboard cameras while the race car travels on the racetrack during a race; being selectively connected to one of the set of Wi-Fi hotspots while the race car travels on the racetrack; and streaming the received racing videos to a server via the connected Wi-Fi hotspot.

In some embodiments, the one or more onboard cameras include a front-view camera and a rear-view camera.

In some embodiments, the real-time racing video capturing system also includes a set of track cameras positioned substantially evenly around the racetrack.

In some embodiments, the controller can be used to receive in real-time a set of racing metadata through a controller area network (CAN bus) of the race car while the race car travels on the racetrack.

In some embodiments, the racing metadata include dynamic parameters associated with the race car, such as speed, lateral-G, RPM, oil temperature, brake forces, and traction forces.

In some embodiments, the controller can be used to stream the received racing metadata to the server while the race car travels on the racetrack.

In some embodiments, the controller can be used to upload racing videos captured from a previous race while the race car travels on the racetrack.

In some embodiments, the controller can be used to upload the racing videos after the race if the controller has not already streamed or has not finished streaming the racing videos captured during the race.

In some embodiments, the set of track cameras and the set of Wi-Fi hotspots are co-located such that each of the set of Wi-Fi hotspots is placed at or in the vicinity of a corresponding track camera in the set of track cameras.

In some embodiments, the controller can be selectively connected to one of the set of Wi-Fi hotspots while the race car travels on the racetrack by detecting and connecting to a Wi-Fi hotspot in the set of Wi-Fi hotspots located in a sector of the racetrack in which the race car is located.

In some embodiments, when the race car travels to a next sector of the racetrack, the controller can disconnect from the currently connected Wi-Fi hotpot and connect to a Wi-Fi hotpot located in the next sector of the racetrack, and start using the newly connected Wi-Fi hotspot to stream the received racing videos and racing metadata.

In some embodiments, the disclosed real-time racing video capturing system includes a position tracking subsystem for tracking the position of the race car while the race car travels on the racetrack.

In some embodiments, the position tracking subsystem can track the position of the race car by: receiving global positioning system (GPS) coordinates of the race car while the race car travels around the racetrack; receiving local positioning system (LPS) coordinates of the race car which measure positions of the race car in relation to the set of Wi-Fi hotspots; and combining the received GPS coordinates and LPS coordinates to compute relative positions of the race car in relation to the set of track cameras.

In some embodiments, the position tracking subsystem uses the computed relative positions of the race car to control the set of track cameras.

In some embodiments, the position tracking subsystem controls the set of track cameras by adjusting the positions of a given track camera to lock on the race car before the race car passes through a sector of the racetrack where the given track camera is located.

In some embodiments, the positions of the given track camera include tilt, pan, and zoom of the given track camera.

In some embodiments, the position tracking subsystem can also generate a universal time signal for a given track camera in the set of track cameras so that the recording of the given track camera is time-synced with the recording of the onboard cameras based on the universal time signal.

In another aspect, a process for capturing real-time racing videos for a race car travels around a racetrack is disclosed. This process includes the steps of: receiving, by a controller installed on the race car, a signal indicating that a car race has started; triggering one or more onboard cameras of the race car to record a low quality briefing video when the race car drives toward an entrance of the racetrack prior to entering the racetrack; causing the one or more onboard cameras of the race car to record high quality racing videos after the race car is detected to have entered the racetrack, and while recording the high quality racing videos, streaming in real-time the recorded high quality racing videos to a server; and terminating the recording of the high quality racing videos when the race car is detected to have exited the racetrack.

In some embodiments, receiving the signal indicating that the car race has started includes detecting a client plugging in a personalized-key into an onboard controller of the race car, wherein the personalized-key is generated specifically for the client and the race car. In some embodiments, the personalized-key includes an USB key.

In some embodiments, streaming in real-time the recorded high quality racing videos includes the steps of: selectively connecting the controller to one of a set of Wi-Fi hotspots placed around the racetrack; and streaming in real-time the recorded high quality racing videos from the controller to a server through the connected Wi-Fi hotspot.

In some embodiments, after receiving the signal indicating that the car race has started, the process further includes collecting real-time racing metadata through a controller area network (CAN) of the race car and streaming the collected racing metadata to a main server from the controller.

In some embodiments, the pre-recording stops and the recording of high quality racing videos starts when the controller detects that the race car has reached a predetermined speed.

In yet another aspect, a process for capturing and delivering real-time racing videos for a race car travelling on a racetrack is disclosed. This process includes the steps of: causing one or more onboard cameras of the race car to start recording racing videos; receiving in real-time racing videos captured by the one or more onboard cameras while the race car travels on the racetrack; receiving in real-time a set of racing metadata through a controller area network (CAN bus) of the race car while the race car travels on the racetrack; selectively connecting to the closest Wi-Fi hotspot to the race car in a set of Wi-Fi hotspots positioned around the racetrack while the race car travels on the racetrack; and streaming the received racing videos and the racing metadata to a server coupled to the set of Wi-Fi hotspots via the connected Wi-Fi hotspot.

In some embodiments, the process selectively connecting to the closest Wi-Fi hotspot to the race car by: while connected to a first Wi-Fi hotspot in the set of Wi-Fi hotspots, detecting that a second Wi-Fi hotspot in the set of Wi-Fi hotspots has become the closest Wi-Fi hotspot; disconnecting from the first Wi-Fi hotspot; and connecting to the second Wi-Fi hotspot.

In some embodiments, the process further includes using a set of track cameras placed around the racetrack and co-located with the set of Wi-Fi hotspots to record track videos while the race car travelling on the racetrack; and streaming the track videos to the server via the set of Wi-Fi hotspots.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

Figure 1:
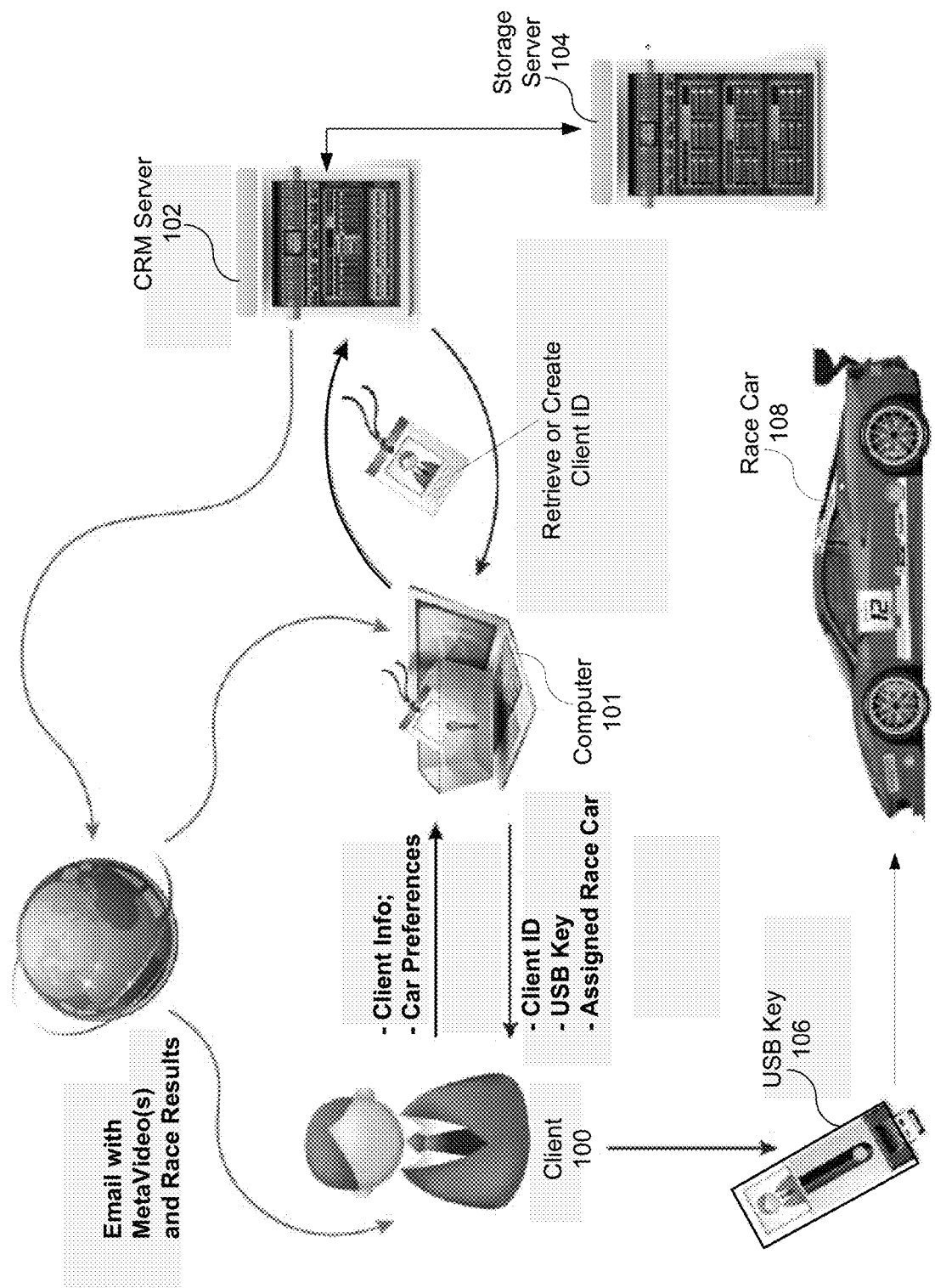
FIG. 1 shows a diagram illustrating an exemplary system and process of preparing a client for a new car race in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

This patent disclosure provides examples of systems, devices, and techniques for capturing and streaming/delivering racing videos in real-time for racing sports. In some embodiments, the disclosed systems and techniques are designed to capture racing video signals using both the onboard cameras of the race car and a set of cameras installed around the racetrack. The captured racing videos and racing metadata can be uploaded or streamed live to a server as the race car travels around a racetrack by connecting the race car to a nearby or the closest Wi-Fi hotspot to the race car within a set of Wi-Fi hotspot placed around the racetrack. The uploaded multiple channels of racing video signals can be combined with racing metadata collected from the race car to generate "meta-video" packages which can be automatically delivered in multiple formats. Additionally, the disclosed systems and techniques can upload the racing videos online to a number of social media outlets, find and detect the customers/clients associated with the racing videos, and automatically share the hyperlinks and racing metadata with the customers/clients. The disclosed systems and techniques can be configured to be fully automated and hence require zero film crew.

The disclosed racing video capturing and delivering systems and techniques (or "racing video systems and techniques") provide beginner race car drivers with professional data and software tools which were not previously available to the general public. Using these data and software tools, the drivers are able to analyze their performances for each race on a given race car and for each segment of the racetrack. The disclosed racing video systems and techniques can bring the functionality of car racing video games, such as Sony PlayStation video games to the real world, allowing customers/clients to feel as if they take part in professional car racing events. The disclosed racing video systems and techniques can also help racetracks anywhere to significantly improve customer relationship by providing a highly personal and professional customer experience, and to stimulate consumers' desire to purchase more racing experiences including more car races and more racing videos produced from the car races.

FIG. 1 shows a diagram illustrating an exemplary system and process of preparing a client for a new car race in accordance with some embodiments described herein. More specifically, FIG. 1 shows that a client 100 comes to the sales office or the front desk of a racetrack business to request about a race car and/or a race. Client 100 is then asked to provide personal information, such as his/her identification (ID) and the race cars that client 100 desires to race. The personal information and race car preferences provided by client 100 are then entered into a computer 101 which is coupled to a customer relationship management (CRM) server 102 of the racetrack business. CRM server 102 receives client 100's personal and race car information and is configured to process the received personal info by matching the information against client and race records stored in a race storage server 104 coupled to the CRM server 102. In some embodiments, this matching operation can include matching the personal information of client 100 with an existing database (e.g., a SQL database) configured to store previous racing experiences purchases at the racetrack and race results associated with each of the race cars at the racetrack.

If a match is found in the storage server 104 for client 100, CRM server 102 can retrieve existing client ID associated with client 100 and assign a race car 108 based on the client 100's race car preferences. CRM server 102 is also configured to generate a personalized key, such as a USB key 106 that identifies client 100 to the assigned race car 108. However, if no match is found in the storage server 104 for client 100, CRM server 102 automatically generates a new client ID for client 100 and may ask client 100 for more information, such as addresses, phone numbers, and payment methods, before assigning a race car and generating a personalized key. Although the disclosure below is described in terms of USB key 106, other forms of personalized key to identify client 100 to race car 108 can be generated and used in place of USB key 106 without departing from the scope of the present disclosure. Moreover, although the exemplary system shows CRM server 102 and storage server 104 as separate devices, other embodiments of the present disclosure can have CRM server 102 and storage server 104 integrated as a single device.

Figure 2:
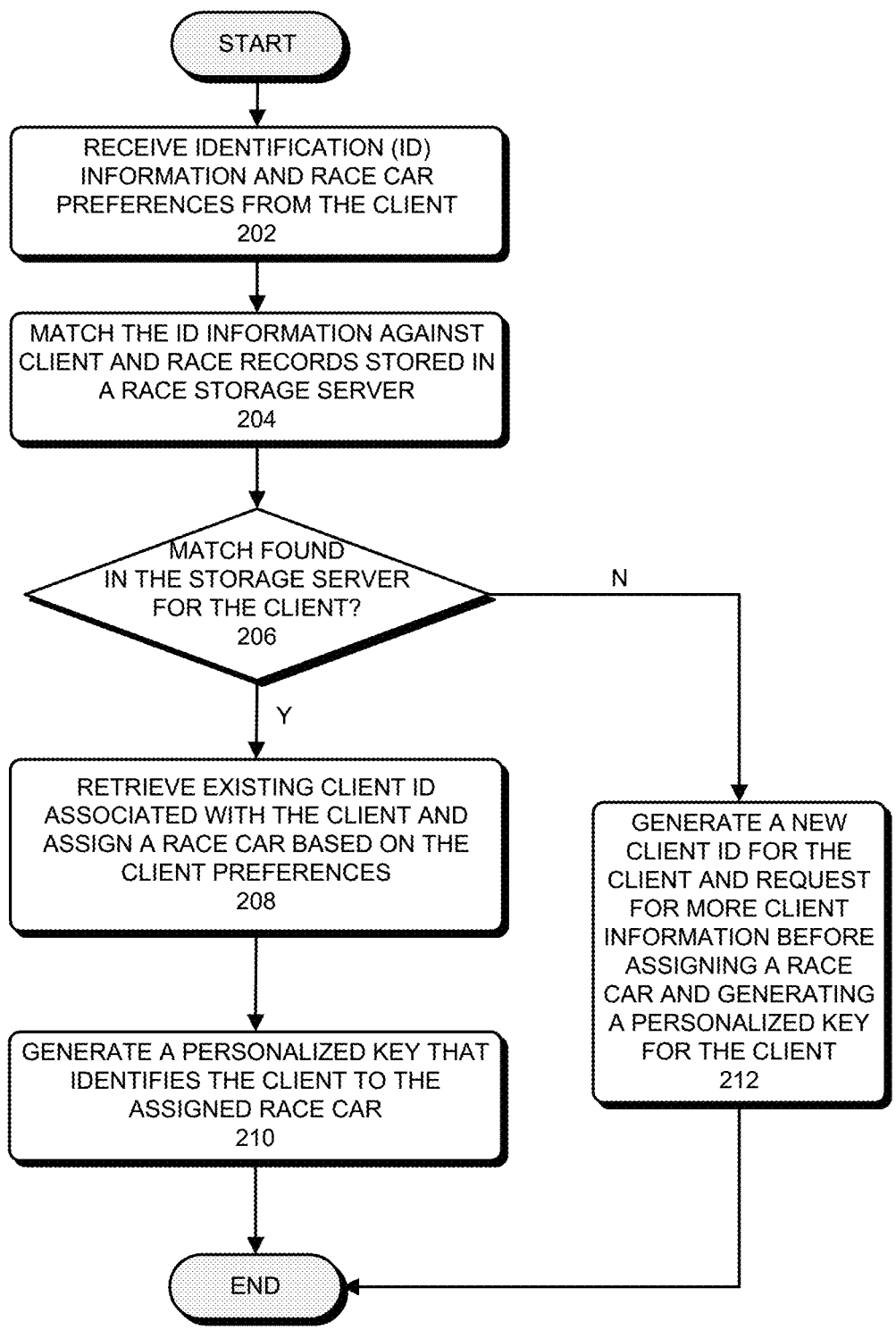
FIG. 2 presents a flowchart illustrating a process of preparing a client for a new car race in accordance with some embodiments described herein.

FIG. 2 presents a flowchart illustrating a process of preparing a client for a new car race in accordance with some embodiments described herein. The process starts by receiving identification (ID) information and the race car preferences from the client (step 202). Next, the process matches the ID information against client and race records stored in a race storage server (step 204). Next, the process determines if a match is found in the storage server for the client (step 206). If a match is found, the process then retrieves existing client ID associated with the client and assigns a race car based on the client's preferences (step 208). The process also generates a personalized key that identifies the client to the assigned race car (step 210). However, if no match is found in the storage server for the client, the process automatically generates a new client ID for the client 100 and requests for more client information before assigning a race car and generating a personalized key for the client (step 212).

Racing Video Capturing System and Process

Figure 3:
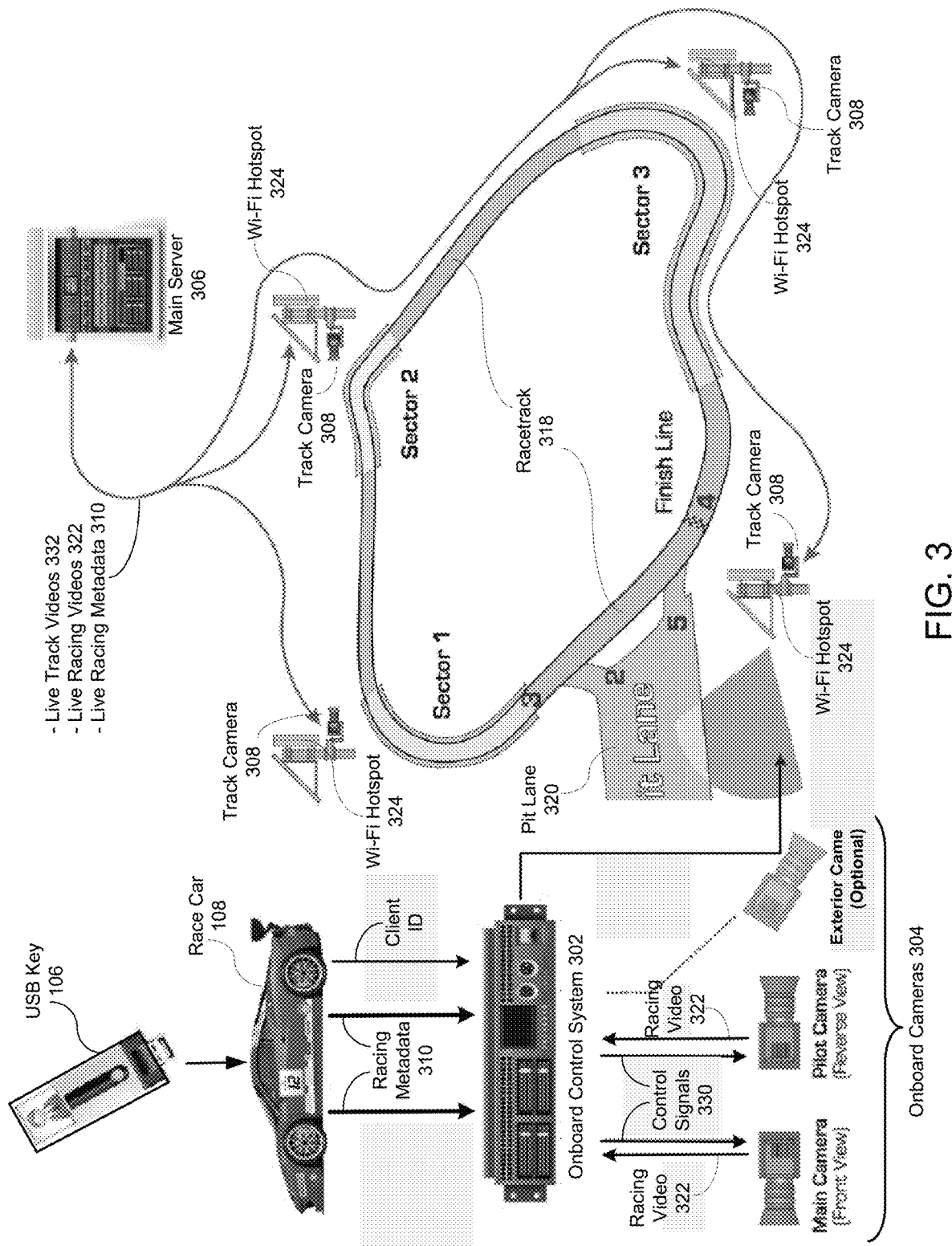
FIG. 3 shows a diagram illustrating an exemplary system and process of capturing and delivering real-time racing videos and racing metadata during a race in accordance with some embodiments described herein.
Figure 4:
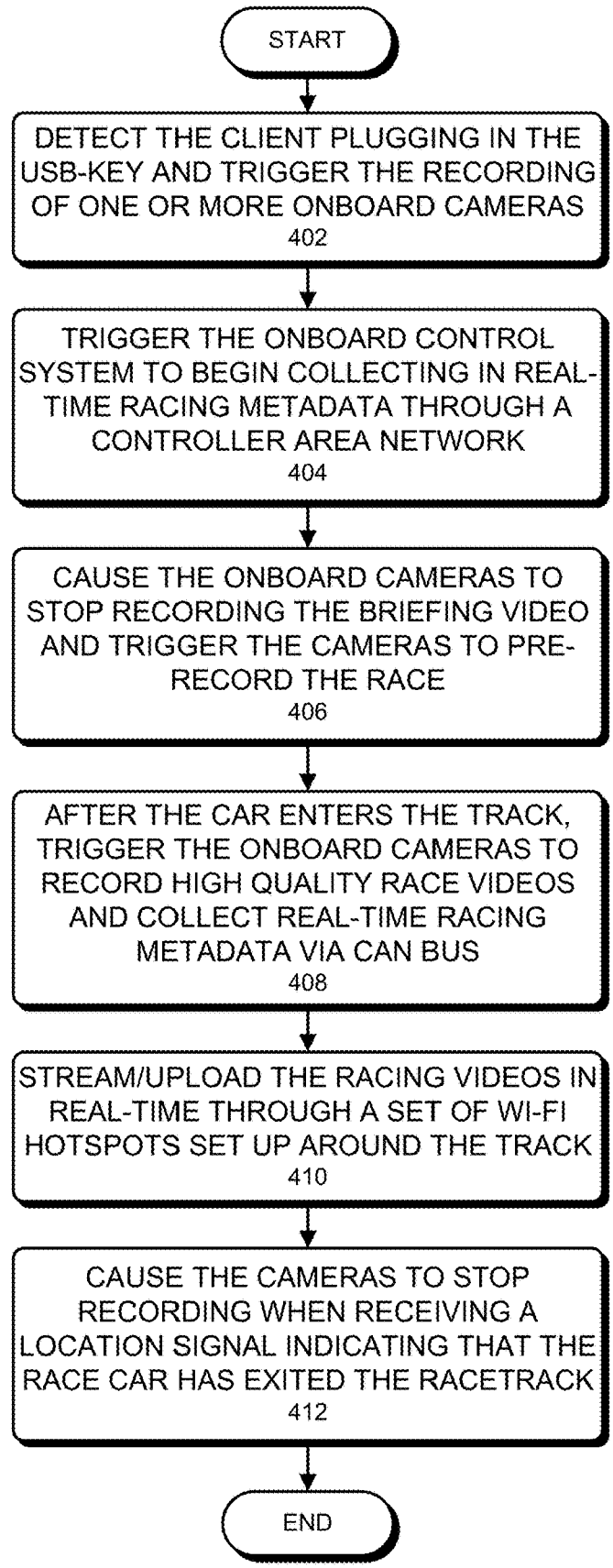
FIG. 4 presents a flowchart illustrating a process of capturing and delivering real-time racing videos and racing metadata during a race in accordance with some embodiments described herein.

In some embodiments, upon receiving the client ID, USB key 106, and the assignment of race car 108, client 100 can start a race with the assigned race car 108. The following discussion provides an exemplary system and process of capturing and delivering real-time racing videos during such a race by client 100, which is described in conjunction with both FIG. 3 and FIG. 4. FIG. 3 shows a diagram illustrating an exemplary system and process of capturing and delivering real-time racing videos and racing metadata during a race in accordance with some embodiments described herein. FIG. 4 presents a flowchart illustrating a process of capturing and delivering real-time racing videos and racing metadata during a race in accordance with some embodiments described herein.

As can be seen in FIG. 3, the exemplary racing video capturing and delivering system includes an onboard control system 302. Although onboard control system 302 is shown being separated from race car 108, onboard control system 302 is actually located onboard race car 108. In some embodiments, onboard control system 302 is coupled to the onboard computer of race car 108. In other embodiments, onboard control system 302 is integrated with the onboard computer of race car 108. The exemplary racing video capturing and delivering system also includes one or more onboard cameras 304 coupled to onboard control system 302. As shown in FIG. 3, onboard control system 302 can be used to control the operation of onboard cameras 304 by sending a set of control signals 330. In some embodiments, the set of control signals 330 can include, but are not limited, start/stop recording commands, location data, and ID information from USB key 106. In some embodiments, onboard cameras 304 can include a main camera or the front-view camera and a pilot camera or the rear-view camera, both of which are installed inside race car 108. The onboard cameras 304 can also optionally include one or more external cameras installed on the body or the wheels of race car 108. The exemplary racing video capturing and delivering system additionally includes a set of track cameras 308 installed around racetrack 318. The exemplary racing video capturing and delivering system can also include a set of Wi-Fi hotspots positioned around racetrack 318. Moreover, the exemplary racing video capturing and delivering system can include a main server 306 coupled to the set of track cameras 308, e.g., via fiber optic links.

In some embodiments, the racing video capturing process begins when the system detects client 100 plugging in USB key 106 into onboard control system 302, which subsequently triggers the recording by onboard cameras 304 (step 402 in FIG. 4). Note that because USB key 106 is uniquely created for client 100, once USB key 106 is plugged into onboard control system 302, onboard control system 302, which can be wirelessly connected to the front desk/control center of racetrack 318 (e.g., CRM server 102 in FIG. 1), recognizes client 100 and confirms with the front desk/control center (e.g., with CRM server 102) that client 100 is about to start the race on racetrack 318 in race car 108. After receiving the confirmation from the front desk/control center, onboard control system 302 subsequently sends commands to onboard cameras 304 to start recording. In some embodiments, onboard control system 302 can be configured to independently trigger the recording of onboard cameras 304 upon detecting the insertion of USB key 106 without requiring further commutation with and confirmation from the front desk/control center. In these embodiments, onboard control system 302 can be used to verify that the client ID stored on USB key 106 has been uniquely generated for race car 108.

Besides triggering the recording of onboard cameras 304, a number of other actions can be triggered by plugging in USB key 106. These actions can include causing CRM server 102 to send a command to main server 306 to prepare capturing the race of race car 108 with the set of track cameras 308. The actions triggered by plugging in USB key 106 can also include causing main server 306 to synchronize times/clocks between the onboard cameras 304 and track cameras 308. The exemplary process of synchronizing times/clocks between the onboard cameras 304 and track cameras 308 is described in more detail below. In some embodiments, plugging USB key 106 into onboard control system 302 also triggers onboard control system 302 to begin collecting a set of car racing-related metadata (or "racing metadata") 310 in real-time through a controller area network (CAN bus) (not shown in FIG. 3) of race car 108 (step 404 in FIG. 4). Racing metadata 310 can include a number of dynamic parameters associated with the race car status, which include, but are not limited to: car speed, lateral-G, RPM, oil temperature, brake forces, and traction forces. Racing metadata 310 can also include static values such as a race car ID which uniquely identifies race car 108 being driven.

In some embodiments, after starting the video recording, onboard cameras 304 of the disclosed racing video capturing system record a briefing video before race car 108 starts moving, and subsequently stops recording the briefing video once race car 108 starts moving. The briefing video can be recorded at a lower video quality, e.g., in 720p quality. In some embodiments, onboard cameras 304 can continue recording the briefing video after the race car starts moving but only when race car 108 is traveling at low speed. In these embodiments, onboard cameras 304 stop recording the briefing video once the speed of race car 108 reaches a predetermined value, e.g., at 5 mph. In another embodiment, onboard cameras 304 continues recording the briefing video as race car 108 travels on pit lane 320 of racetrack 318, and stops recording the briefing video when race car 108 approaches the exit of pit lane 320 or the entrance of racetrack 318 (shown by the letter "2" in FIG. 3). In some embodiments, race car 108 starts pre-recording the race once the recording of the briefing video stops, but will only keep a short segment of the this pre-recorded video footage corresponding to a time period from the point when the car stops waiting in line in pit lane 320 to the point when the car has reached a predetermined speed, e.g., 5 mph.

In some embodiments, when race car 108 approaches the entrance of racetrack 318 from pit lane 320, onboard control system 302 starts receiving a location signal indicating that race car 108 waits in a queue to enter racetrack 318 to start the race. This location signal can be generated based on both the global positioning system (GPS) signal and a local positioning system (LPS) signal. The combined location signal based on the GPS signal and the LPS signal for tracking race car 108 is referred to as a "GLPS" signal, which is described in more detail below. In some embodiments, once starting receiving the GLPS signal, onboard control system 302 stops onboard cameras 304 from recording the briefing video, and triggers onboard cameras 304 to pre-record the race (step 406 in FIG. 4). This pre-recording video footage can be recorded in high quality and can continue as long as race car 108 waits in queue to enter racetrack 318. However, once the race car enters the racetrack, the disclosed racing video capturing system begins recording the race in the desired high quality, such as in HD or ultra HD (UHD) including 4K UHD. In some embodiments, the front-view camera and the rear-view camera of onboard cameras 304 can be configured to record at different video qualities. In one embodiment, the front-view camera is configured to record the race at an UHD quality while and the rear-view camera is configured to record the race at 720p. In some embodiments, the system keeps only the last few seconds (e.g., 5 seconds) of the pre-recorded "waiting" video footage.

In some embodiments, after race car 108 entering racetrack 318 to start the race, onboard control system 302 triggers onboard cameras 304 to begin recording high quality racing videos 322 and collects real-time racing metadata 310 through the CAN bus of race car 108, which can be later used to generate race results and statistics (step 408 in FIG. 4). The high quality recording by onboard cameras 304 continues while race car 108 travels around racetrack 318 doing laps. In some embodiments, if the set of track cameras 308 has not already started recording footages on corresponding sectors of racetrack 318, after race car 108 entering racetrack 318 to start the race, onboard control system 302 can also cause track cameras 308 to begin recording track videos on corresponding sectors of racetrack 318. For example, onboard control system 302 can trigger the recording of the set track cameras 308 through main server 306 coupled to track cameras 308.

In some embodiments, while recording the race, onboard control system 302 streams and uploads the recorded video signals in real-time to main server 306 through a set of Wi-Fi hotspots 324 installed around racetrack 318 (step 410 in FIG. 4). In the embodiment shown in FIG. 3, the set of Wi-Fi hotspots 324 are co-located with the set of the set of track cameras 308. In these embodiments, when the set of track cameras 308 are placed substantially evenly around racetrack 318, the set of Wi-Fi hotspots 324 are also positioned substantially evenly around racetrack 318. The configuration of the set of Wi-Fi hotspots and the process of streaming and uploading racing videos via the Wi-Fi hotspots are described in more detail below in conjunction with FIG. 5.

In some embodiments, onboard control system 302 is configured to treat the first lap of the race as a "warm up" lap and therefore does not use the collected data, such as time and speed, from the first lap for generating race results. In some embodiments, onboard control system 302 causes onboard cameras 304 to stop recording the race when onboard control system 302 receives a location signal indicating that race car 108 has exited racetrack 318 and completed the race (step 412 in FIG. 4). In some embodiments, this location signal is the GLPS signal mentioned above and further described below. In some embodiments, after recording has stopped and if onboard control system 302 has not already streamed the videos during the race, onboard control system 302 uploads the racing videos, for example, via the set of Wi-Fi hotspots 324 around racetrack 318 or through a standard vehicle-based internet connection, such as a cellular connection.

In some embodiments, the disclosed racing video capturing and delivering system includes a synchronization module for onboard cameras 304 and track cameras 308 so that the recording of onboard cameras 304 can be time-synced with the recording of track cameras 308 for the same race. This synchronization module can be implemented on main server 306. In some embodiments, the synchronization module is configured to generate a universal timecode which can be used to sync onboard cameras 304 with individual track cameras 308. More specifically, the synchronization module receives the position information of race car 108, e.g., by using the aforementioned GLPS signal, and converts the position information into a time. The synchronization module then syncs the computed time with its own time to generate a universal timecode. The synchronization module subsequently syncs onboard cameras 304 with a particular track camera 308 in the set of track cameras 308 as race car 108 approaches the sector of the racetrack 318 covered by that track camera 308. In this manner, the recording of the particular track camera is synced with the recording of onboard cameras 304.

Racing Videos Streaming and Uploading System and Process

As described above, as the race car travels around the racetrack doing laps, onboard control system 302 receives captured racing videos 322 from onboard cameras 304 which capture high quality videos of the current race and also racing metadata 310 from the CAN bus which collects performance data of race car 108, including speed, RPM, oil temperature, brake forces, and traction forces, among others. In some embodiments, onboard control system 302 uploads or streams the real-time video signals 322 of the current race live to main server 306, for example, through the set of Wi-Fi hotspots 324 coupled to main server 306. In some embodiments, if client 100 has done multiple races for the same day, but not all of the racing videos have been uploaded to the main server, onboard control system 302 can continue uploading the previous races during the current race, while at the same time streaming video signals 322 of the current race. In some embodiments, the disclosed racing video capturing and delivering system streams the current race with a short delay, e.g., 10 seconds, so that the live stream can be edited. In addition to uploading and streaming racing videos of the previous and current races, the disclosed system can upload and stream racing metadata 310 of the previous and current races to the main server 306, for example, through the set of Wi-Fi hotspots 324 coupled to main server 306. As can be seen in FIG. 3, track videos 332 captures by the set of track cameras 308 during the race of race car 108 can also be streamed live to main server 306 through the set of Wi-Fi hotspots 324 coupled to main server 306.

Figure 5:
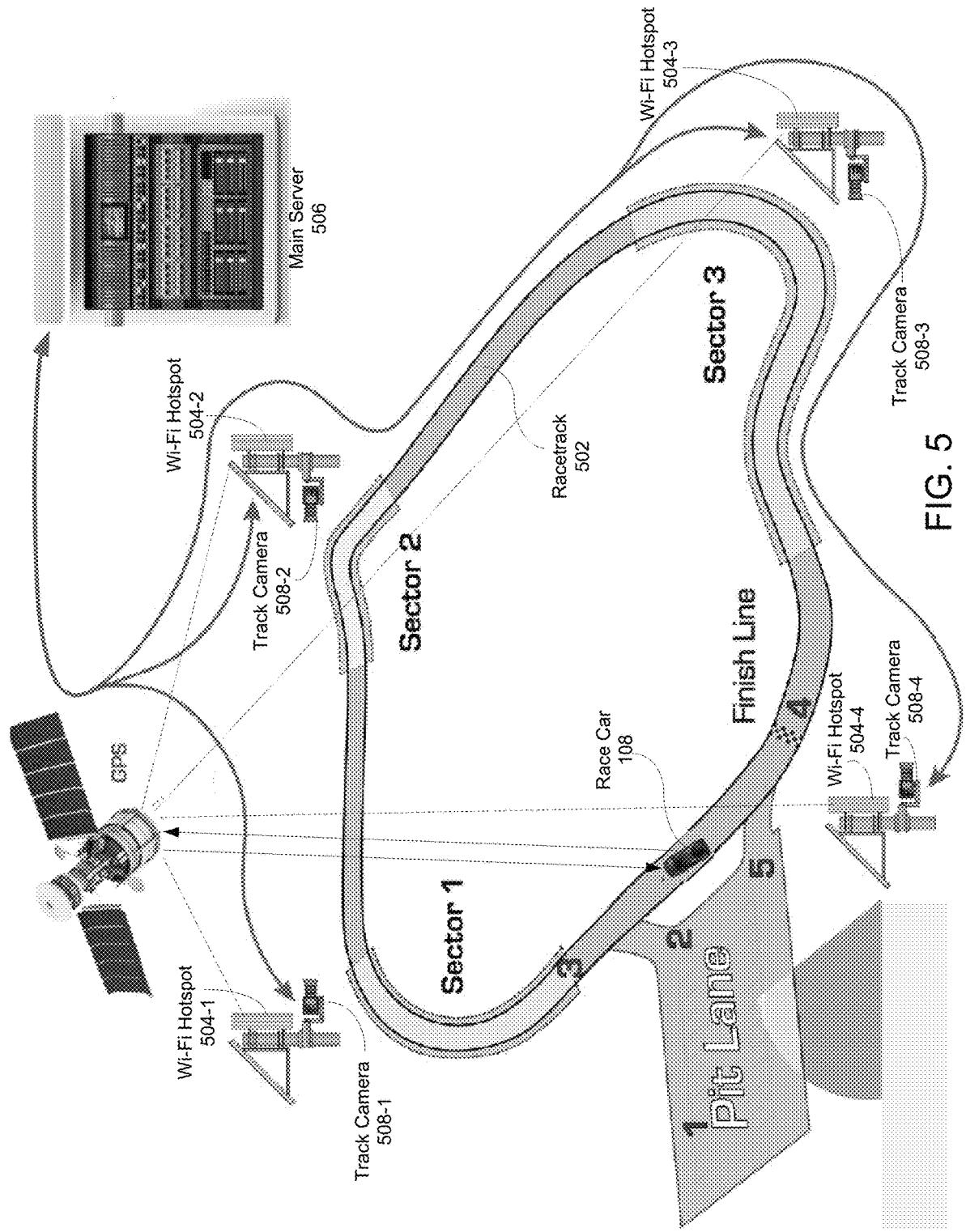
FIG. 5 shows an example racetrack having four track sectors and four Wi-Fi hotspots set up around the racetrack in accordance with some embodiments described herein.

In some embodiments, the set of Wi-Fi hotspots 324 is set up around racetrack 318, for example, one in each sector of the racetrack. FIG. 5 shows an example racetrack 502 having four track sectors and four Wi-Fi hotspots 504 set up around the racetrack 502 in accordance with some embodiments described herein. However, other embodiments of the racetrack configuration can include fewer or greater than four track sectors and four track cameras. In one embodiment, the set of Wi-Fi hotspots 504-1 to 504-4 are co-located with the set of track cameras 508-1 to 508-4, e.g., one Wi-Fi router can be placed on or in the vicinity of the installation for attaching each track camera 508 to create a corresponding Wi-Fi hotspot 504. However, other embodiments can have greater or fewer number of Wi-Fi hotspots 504 than the number of track cameras 508 without departing from the scope of the present disclosure. Hence, as race car 108 travels around racetrack 502, onboard control system 302 (not shown) can connect to a nearby (which is also the closest) Wi-Fi hotspot (e.g., Wi-Fi hotspot 504-4) as race car 108 passes through a corresponding sector (e.g., sector 4) of racetrack 502 (which may require onboard control system 302 to disconnect from the previous connected Wi-Fi hotspot), and subsequently use the newly connected Wi-Fi hotspot (e.g., Wi-Fi hotspot 504-4) to stream and upload the captured racing videos and racing metadata. Next, when race car 108 approaches the next sector (e.g., sector 1) of racetrack 502, race car 108 disconnects from the current connected Wi-Fi hotspot (e.g., Wi-Fi hotspot 504-4) and connects to the next Wi-Fi hotspot (e.g., Wi-Fi hotspot 504-1) and subsequently uses the newly connected Wi-Fi hotspot to stream and upload the captured racing videos and racing metadata. In this manner, race car 108 continuously disconnects and connects to different Wi-Fi hotspots installed around racetrack 502 as the car travels around the racetrack and uses different Wi-Fi hotspots to continue streaming and uploading the captured racing videos and racing metadata. Although the above-described embodiment suggests that race car 108 connects to one Wi-Fi hotspot at a time, other embodiments of the present disclosure can have race car 108 connects to more than one Wi-Fi hotspot at a given time, and use the multiple connected Wi-Fi hotspots to stream and upload the captured racing videos and racing metadata.

Global-Local Positioning (GLPS) Subsystem

In some embodiments, the disclosed racing video capturing and delivering system also includes a GLPS subsystem for race car position tracking and track camera control. Exemplary operations of the disclosed GLPS subsystem are described herein in conjunction with the example racetrack 502 illustrated in FIG. 5. In some embodiments, the GLPS subsystem can be implemented in software on main server 506. The GLPS subsystem can include a GLPS signal generation mechanism which is configured to compute positions of race car 108 traveling on racetrack 502 relative to the set of track cameras 508. More specifically, the GLPS subsystem receives GPS coordinates of the race car 108 as the car travels around the racetrack 502. In one embodiment, the GLPS subsystem receives the GPS coordinates through the racing metadata streamed to main server 506 from race car 108.

The GLPS subsystem can also receive LPS coordinates of race car 108 in communication with the set of dynamic Wi-Fi hotspots 504 around racetrack 502. More specifically, onboard control system 302 of race car 108 can include functions to determine the LPS coordinates of race car 108. For example, as race car 108 travels on racetrack 502, the car communicates with multiple Wi-Fi hotspots 504 located around racetrack 502. Based on the positions of race car 108 relative to the multiple fixed-location Wi-Fi hotspots 504, onboard control system 302 can determine the local coordinates of the race car 108, for example, using triangulation or other positioning algorithms. Hence, as the race car travels around racetrack 502, onboard control system 302 generates an array of local coordinates (i.e., the LPS coordinates), which can also be streamed to main server 506 via the Wi-Fi hotspots 504.

In some embodiments, the disclosed GLPS subsystem, which can reside on main server 506, combines the received GPS coordinates and LPS coordinates to compute positions of race car 108 in relation to the set of track cameras 508. For example, the GLPS subsystem can choose either the GPS coordinates or the LPS coordinates as the main source of position inputs and then use the other set of coordinates to correct and obtain more accurate positions of race car 108 relative to the set of track cameras 508. In one embodiment, the LPS coordinates are used as the main source of position information while the GPS coordinates are used to adjust the precision of the LPS coordinates to generate the final GLPS coordinates for race car 108. In some embodiments, the disclosed GLPS subsystem on main server 506 can use the generated GLPS coordinates for race car 108 to determine if race car 108 goes outside of racetrack 502. In some embodiments, the disclosed GLPS subsystem can be configured to simultaneously track multiple race cars on racetrack 502 and subsequently generate the GLPS coordinates for the multiple race cars moving around the same track 502, for example, in form of a position matrix.

Hence, while race car 108 travels around on racetrack 502, the onboard control system of race car 108 transmits multitudes of racing metadata associated with race car 108, including the aforementioned LPS coordinates of race car 108, the GPS coordinates of race car 108 received from a GPS system, speed, lateral-G, RPM, among others, to main server 506. Main server 506 can use the received racing metadata to determine safety conditions of race car 108 during the race, including but not limited to: whether race car 108 goes outside of racetrack 502, whether race car 108's speed is below a safety limit (e.g., <10 mph), whether race car 108 has stopped or collided with objects or another car. In some embodiments, based on the above determinations, main server 506 can then send notifications to safety departments indicating abnormal behaviors of race car 108 and notifications to engineers from car service and maintenance departments indicating race car 108 needs to be checked and presenting them with real-time status of race car 108. Based on the computed GLPS coordinates, main server 506 can also send notifications to a given camera in the set of track cameras 508 indicating race car 108 is approaching that track camera.

In some embodiments, the set of track cameras 508 are motorized cameras wherein each track camera has a dedicated motion mount controlled by a motor controller which adjusts the positions and other functions of the track camera. In some embodiments, each of the motorized track cameras 508 can be controlled based on the received GLPS coordinates of race car 108 from the GLPS subsystem. More specifically, after obtaining the GLPS coordinates of race car 108, the GLPS subsystem feeds the computed live position data, including the GLPS coordinates to the motor controllers of the set of track cameras 508. The motor controllers, after receiving the GLPS coordinates of race car 108, can determine the position and distance of race car 108 in relation to the respective track cameras 508 and "prepare" the track cameras to "frame" race car 108. In some embodiments, a given motor controller can adjust a given track camera to "frame" race car 410 before the car passes through a respective track sector covered by the given track camera.

Figure 6:
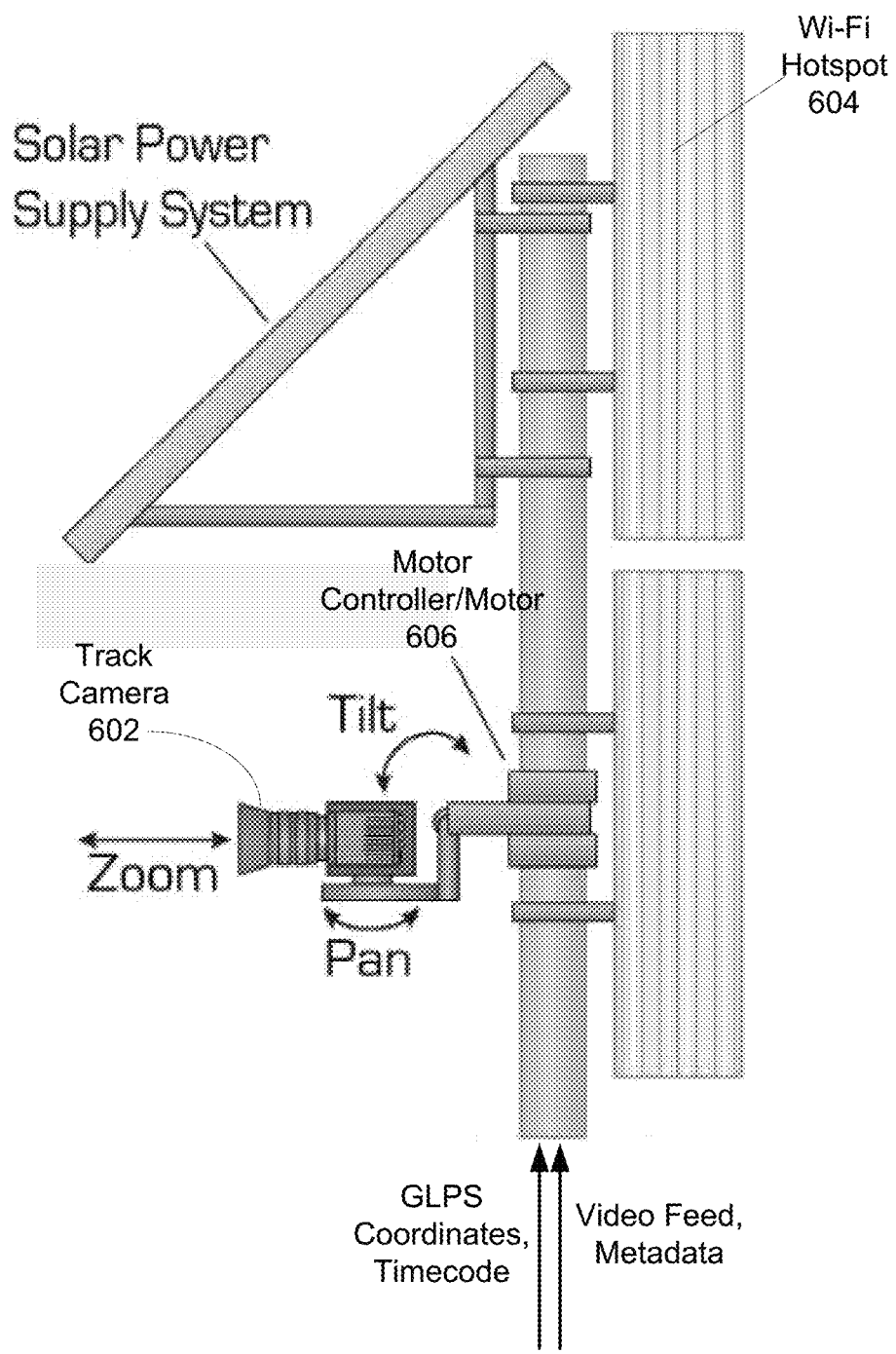
FIG. 6 shows an exemplary camera installation including a motorized track camera and a Wi-Fi hotspot in accordance with some embodiments described herein.

FIG. 6 shows an exemplary camera installation 600 including a motorized track camera 602 and a Wi-Fi hotspot 604 in accordance with some embodiments described herein. In the embodiment shown, camera installation 600 includes a pole like structure for mounting both motorized track camera 602 and Wi-Fi hotspot 604. Moreover, described motorized track camera 602 can be used to implement each of the track cameras 408 shown in FIG. 4.

As can be seen in FIG. 6, in order to frame the approaching race car, a motor controller/motor 606 of motorized track camera 602 constantly adjusts the pan, tilt and zoom of track camera 602 based on the received GLPS coordinates of the race car. Once having the race car framed, track camera 602 can follow the race car as the car travels through the given sector of the racetrack covered by track camera 602. After the race car passes through the given sector, motor controller/motor 606 can adjust track camera 602 to continue "following" the "framed" race car for some distance, for example, as the car traveling through a turn. In some embodiments, the adjustable positions and functions of track camera 602 include, but are not limited, the tilt, the pan, and the zoom of track camera 602.

Generating Meta-Video Packages

As discussed above, when a customer's race car completes a race on the racetrack, the following race data and metadata have been generated and uploaded: onboard video footages captured by the onboard cameras; track video footages captured by the track cameras; and racing metadata collected during the race including but not limited to: speed, lateral-G, RPM, oil temperature, brake forces, and traction forces, GPS coordinates, and LPS coordinates of the race car. In some embodiments, the above race data and metadata can be used to generate a racing video package, referred to as a "meta-video package." In one example, the meta-video package contains 5 videos: a full racing video, e.g., of about 2-10 minutes in length; a best lap video, e.g., of about 1 minute in length; a "Sector 1" video wherein the maximum speed of the race was recorded, e.g., about 10-15 seconds in length; a "Sector 2" video wherein the maximum lateral-G of the race was recorded, e.g., about 10-15 seconds in length; and a "Sector 3" video wherein the best time of the race was recorded, e.g., about 10-15 seconds in length. The above example of the disclosed meta-video package is for demonstration purpose only, while many other formats of racing video packages can be used based on the captured racing videos and metadata without departing from the scope of the present disclosure. Referring back to FIG. 1, note that after producing the meta-video package for a completed race, CRM server 102 can be used to email the hyperlink of the meta-video package and optionally the race results to client 100 if the front desk personnel confirms the purchase of the meta-video package by client 100.

Racing Video Processing Subsystem

Figure 7:
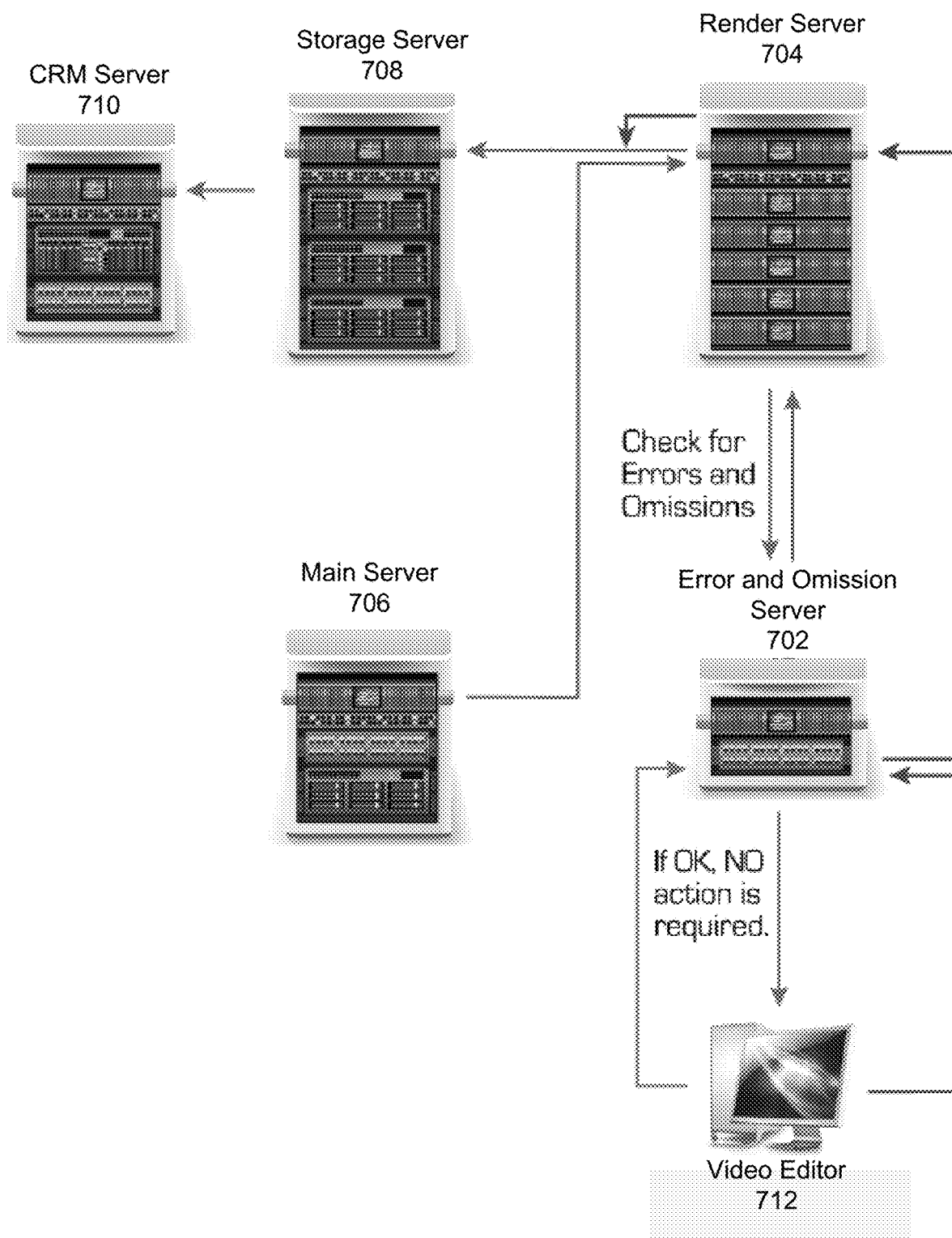
FIG. 7 shows an exemplary racing video processing system including an error and omission processing server for video review and editing in accordance with some embodiments described herein.

It is another aspect of the present disclosure to provide the ability to perform real-time review and edit of the captured racing video footages after the racing videos have been uploaded or streamed to the main server. FIG. 7 shows an exemplary racing video processing subsystem 700 including an error and omission processing server 702 for video review and editing in accordance with some embodiments described herein. In the embodiment shown, main server 706, which can be implemented to be each of the main servers 306 and 506 described in FIG. 3 and FIG. 5, receives the uploaded, raw racing videos and racing metadata. Next, main server 706 sends the raw racing videos and metadata to an error and omission processing server 702, which is configured to analyze position and technical conditions of the race in real-time during each race based on the received raw racing videos and metadata. Error and omission processing server 702 can detect the following abnormal conditions: non-typical race behaviors, for example, the race car has significantly slowed down or stopped during a race; the race car loses control and/or has crossed the boundaries of the racetrack; the race car has mechanical and/or electrical issues; and the race car has a collision with another vehicle. In some embodiments, if any of the above abnormal conditions is detected, error and omission processing server 702 immediately alerts and notifies personnel at the racetrack about such conditions and suggests video editing options. In some embodiments, error and omission processing server 702 can send the video editing options to a human video editor 712 who can use the video editing options as instructions to edit the relevant racing videos and send the edited videos back to error and omission processing server 702.

If no abnormal conditions are detected, error and omission processing server 702 can approve the raw racing videos. Subsequently, error and omission processing server 702 sends the approved raw videos to a render server 704, such as a render farm, to create above described meta-video packages for delivery to the clients. An example meta-video package includes multiple videos for the full race, the best lap, the best results (e.g., in terms of speed/lateral-G/time for each sector), and the best sector. The produced meta-video packages are then stored on storage server 708, which is connected to CRM server 710 of the racetrack. CRM server 710 can be implemented by CRM server 102 described above in conjunction with FIG. 1 and FIG. 2, storage server 704 can be implemented by storage server 104 described above in conjunction with FIG. 1. Furthermore, error and omission processing server 702 can upload relevant videos in a given meta-video package to social media networks, such as Youtube, Facebook, Instagram, WeTransfer, among other. Otherwise, if no purchase was made, a given meta-video package is stored on storage server 608 for a specific period of time, such as 6-10 months, during which they can be sold to returning customers who have not made the purchases during previous visit.

Although the exemplary racing video processing subsystem 700 shows main server 706, render server 704 and error and omission processing server 702 as separate hardware modules, other embodiments of the disclosed racing video processing subsystem 700 can integrate one of both of error and omission processing server 702 and render server 704 with main server 706.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A real-time racing video capturing system, comprising:
one or more onboard cameras installed on a race car;
a set of Wi-Fi hotspots positioned around the racetrack;
a controller installed on the race car and coupled to the one or more onboard cameras, wherein the controller is configured to:
control the one or more onboard cameras to start and stop recording racing videos;
receive in real-time racing videos captured by the one or more onboard cameras while the race car travels on the racetrack during a race;
be selectively connected to one of the set of Wi-Fi hotspots while the race car travels on the racetrack; and
stream the received racing videos to a server via the connected Wi-Fi hotspot;
a set of track camera co-located with the set of Wi-Fi hotspots such that each track camera in the set of track cameras is placed at the location or in the vicinity of a corresponding Wi-Fi hotspot in the set of Wi-Fi hotspots: and
a position tracking subsystem configured to track the race car while the race car travels on the racetrack by:
receiving global positioning system (GPS) coordinates of the race car while the race car travels around the racetrack;
receiving local positioning system (LPS) coordinates of the race car which measure positions of the race car in relation to the set of Wi-Fi hotspots; and
combining the received GPS coordinates and LPS coordinates to compute relative positions of the race car in relation to the set of track cameras.

2. The real-time racing video capturing system of claim 1, wherein the one or more onboard cameras include a front-view camera and a rear-view camera.

3. The real-time racing video capturing system of claim 1, wherein the controller is further configured to receive in real-time a set of racing metadata through a controller area network (CAN bus) of the race car while the race car travels on the racetrack.

4. The real-time racing video capturing system of claim 3, wherein the racing metadata include dynamic parameters associated with the race car, which include one or more of: speed, lateral-G, RPM, oil temperature, brake forces, and traction forces.

5. The real-time racing video capturing system of claim 3, wherein the controller is further configured to stream the received racing metadata to the server while the race car travels on the racetrack.

6. The real-time racing video capturing system of claim 1, wherein the controller is further configured to upload racing videos captured from a previous race while the race car travels on the racetrack.

7. The real-time racing video capturing system of claim 1, wherein the controller is further configured to upload the racing videos after the race if the controller has not already streamed or has not finished streaming the racing videos captured during the race.

8. The real-time racing video capturing system of claim 1, wherein the controller is selectively connected to one of the set of Wi-Fi hotspots while the race car travels on the racetrack by detecting and connecting to a Wi-Fi hotspot in the set of Wi-Fi hotspots located in a sector of the racetrack in which the race car is located.

9. The real-time racing video capturing system of claim 8, wherein when the race car travels to a next sector of racetrack, the controller is configured to disconnect from the currently connected Wi-Fi hotpot and connect to a Wi-Fi hotpot located in the next sector of the racetrack, and start using the newly connected Wi-Fi hotspot to stream the received racing videos and racing metadata.

10. The real-time racing video capturing system of claim 1, wherein the position tracking subsystem is configured to use the computed relative positions of the race car to control the set of track cameras.

11. The real-time racing video capturing system of claim 10, wherein the position tracking subsystem controls the set of track cameras by adjusting the positions of a given track camera to lock on the race car before the race car passes through a sector of the racetrack where the given track camera is located.

12. The real-time racing video capturing system of claim 11, wherein the positions of the given track camera include tilt, pan, and zoom of the given track camera.

13. The real-time racing video capturing system of claim 10, wherein the position tracking subsystem is further configured to generate a universal time signal for a given track camera in the set of track cameras so that the recording of the given track camera is time-synced with the recording of the onboard cameras based on the universal time signal.

14. The real-time racing video capturing system of claim 1, wherein the controller is configured to stream the received racing videos to a server via the connected Wi-Fi hotspot by first streaming the received racing videos from the race car on the racetrack to the connected Wi-Fi hotspot, and subsequently from the connected Wi-Fi hotspot to the server.

15. A method for capturing and delivering real-time racing videos for a race car travelling on a racetrack, the method comprising:
causing one or more onboard cameras of the race car to start recording racing videos;
receiving in real-time racing videos captured by the one or more onboard cameras while the race car travels on the racetrack;
receiving in real-time a set of racing metadata through a controller area network (CAN bus) of the race car while the race car travels on the racetrack;
selectively connecting to the closest Wi-Fi hotspot to the race car in a set of Wi-Fi hotspots positioned around the racetrack while the race car travels on the racetrack;
streaming the received racing videos and the racing metadata to a server coupled to the set of Wi-Fi hotspots via the connected Wi-Fi hotspot;
receiving global positioning system (GPS) coordinates of the race car while the race car travels around the racetrack;
receiving local positioning system (LPS) coordinates of the race car which measure positions of the race car in relation to the set of Wi-Fi hotspots; and
combining the received GPS coordinates and LPS coordinates to compute relative positions of the race car in relation to the set of Wi-Fi hotspots.

16. The method of claim 15, wherein selectively connecting to the closest Wi-Fi hotspot to the race car in a set of Wi-Fi hotspots includes:
while connected to a first Wi-Fi hotspot in the set of Wi-Fi hotspots, detecting that a second Wi-Fi hotspot in the set of Wi-Fi hotspots has become the closest Wi-Fi hotspot;

disconnecting from the first Wi-Fi hotspot; and
connecting to the second Wi-Fi hotspot.

17. The method of claim 15, wherein the method further includes:
   using a set of track cameras placed around the racetrack and co-located with the set of Wi-Fi hotspots to record track videos while the race car travelling on the racetrack; and
   streaming the track videos to the server via the set of Wi-Fi hotspots.

18. The method of claim 15, wherein streaming the received racing videos to a server via the connected Wi-Fi hotspot includes first streaming the received racing videos from the race car on the racetrack to the connected Wi-Fi hotspot, and subsequently from the connected Wi-Fi hotspot to the server.

* * * * *